United States Patent
Jetti et al.

(10) Patent No.: US 10,326,386 B2
(45) Date of Patent: Jun. 18, 2019

(54) DYNAMIC LINEAR STATOR SEGMENT CONTROL

(71) Applicant: Hyperloop Technologies, Inc., Los Angeles, CA (US)

(72) Inventors: Sandhya Rani Jetti, Irvine, CA (US); Brogan Bambrogan, Los Angeles, CA (US); Joshua Giegel, Hawthorne, CA (US); George O'Neal, Scotts Valley, CA (US); Nima Bahrami, Rancho Palos Verdes, CA (US); James Dorris, Los Angeles, CA (US); Jiaqi Liang, Pasadena, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 116 days.

(21) Appl. No.: 15/478,800

(22) Filed: Apr. 4, 2017

(65) Prior Publication Data

US 2017/0207735 A1     Jul. 20, 2017

Related U.S. Application Data

(63) Continuation of application No. 15/008,024, filed on Jan. 27, 2016, now Pat. No. 9,641,117.
(Continued)

(51) Int. Cl.
*B61C 3/00* (2006.01)
*H02P 6/00* (2016.01)
(Continued)

(52) U.S. Cl.
CPC .............. *H02P 6/006* (2013.01); *B61B 13/12* (2013.01); *B61C 3/00* (2013.01); *H02P 25/06* (2013.01)

(58) Field of Classification Search
CPC ... B61B 13/10; F16K 3/30; F16K 3/03; F16K 3/12; H02P 3/04; H02P 6/00; H02P 25/06;
(Continued)

(56) References Cited

U.S. PATENT DOCUMENTS

| 131,322 A | 9/1872 | Anderson |
| 2,296,771 A | 9/1942 | Crawford et al. |

(Continued)

FOREIGN PATENT DOCUMENTS

| CN | 1860047 | 11/2006 |
| EP | 2371613 | 10/2011 |

(Continued)

OTHER PUBLICATIONS

China Office Action conducted in counterpart China Appln. No. 201680009303.7 (dated Jun. 27, 2018).
(Continued)

*Primary Examiner* — Jason C Smith
(74) *Attorney, Agent, or Firm* — Greenblum & Bernstein, P.L.C.

(57) ABSTRACT

Method for controlling a dynamic linear motor. Method includes defining a path over which a rotor is to travel, placing stator segments at least along portions of the path where the rotor may be one of accelerated and decelerated and supplying a variable amplitude and frequency of voltage to power the stator segments in a synchronized manner so that, as the rotor approaches stator segments, the stator segments are powered and, as the rotor departs stator segments, the stator segments are depowered.

20 Claims, 9 Drawing Sheets

Related U.S. Application Data

(60) Provisional application No. 62/254,368, filed on Nov. 12, 2015, provisional application No. 62/113,511, filed on Feb. 8, 2015.

(51) Int. Cl.
  *B61B 13/12* (2006.01)
  *H02P 25/06* (2016.01)

(58) Field of Classification Search
  CPC .. H02P 6/006; B60L 5/00; B60L 5/005; B60L 13/00; B60L 15/00
  See application file for complete search history.

(56) References Cited

U.S. PATENT DOCUMENTS

| | | | |
|---|---|---|---|
| 2,488,287 A | 11/1949 | Goddard | |
| 2,511,979 A * | 6/1950 | Goddard | B60V 3/04 |
| | | | 104/134 |
| 2,791,633 A | 9/1956 | Sindzinski | |
| 2,956,823 A | 10/1960 | Benjamin, Jr. et al. | |
| 3,006,288 A | 10/1961 | Brown | |
| 3,083,528 A | 4/1963 | Brown | |
| 3,100,454 A | 8/1963 | Dennis | |
| 3,132,416 A | 5/1964 | Hait | |
| 3,233,559 A | 2/1966 | Smith et al. | |
| 3,605,629 A | 9/1971 | Edwards | |
| 3,610,163 A | 10/1971 | Edwards | |
| 3,738,281 A | 6/1973 | Waidelich | |
| 3,750,803 A | 8/1973 | Paxton | |
| 3,768,417 A | 10/1973 | Thornton et al. | |
| 3,776,141 A | 12/1973 | Gelhard et al. | |
| 3,854,411 A | 12/1974 | Lichtenberg | |
| 3,952,667 A | 4/1976 | Kovanov et al. | |
| 3,954,064 A | 5/1976 | Minovitch | |
| 4,015,540 A * | 4/1977 | Roxberry | B60L 13/00 |
| | | | 104/138.1 |
| 4,023,500 A * | 5/1977 | Diggs | B65G 51/04 |
| | | | 104/138.1 |
| 4,075,948 A | 2/1978 | Minovitch | |
| 4,108,077 A | 8/1978 | Laing | |
| 4,148,260 A | 4/1979 | Minovitch | |
| 4,175,414 A | 11/1979 | Peytavin | |
| 4,202,272 A | 5/1980 | Teodorescu et al. | |
| 4,276,832 A * | 7/1981 | Sika | B61B 13/08 |
| | | | 104/292 |
| 4,400,655 A * | 8/1983 | Curtiss | H02J 3/1892 |
| | | | 318/729 |
| 4,427,740 A | 1/1984 | Stackhouse et al. | |
| 4,603,640 A | 8/1986 | Miller et al. | |
| 4,636,666 A | 1/1987 | Meins | |
| 4,636,667 A | 1/1987 | Holzinger et al. | |
| 4,676,294 A | 6/1987 | Samuelson | |
| 4,718,459 A | 1/1988 | Adorian | |
| 4,881,469 A * | 11/1989 | Hirtz | E01B 25/12 |
| | | | 104/138.1 |
| 5,053,654 A | 10/1991 | Augsburger et al. | |
| 5,282,424 A | 2/1994 | O'Neill | |
| 5,388,527 A | 2/1995 | Thornton et al. | |
| 5,619,930 A | 4/1997 | Alimanestiano | |
| 5,712,514 A | 1/1998 | Fischperer et al. | |
| 5,899,635 A | 5/1999 | Kuja et al. | |
| 5,950,543 A | 9/1999 | Oster | |
| 6,178,892 B1 * | 1/2001 | Harding | B60V 3/04 |
| | | | 104/119 |
| 6,279,485 B1 * | 8/2001 | Schlienger | B60V 3/04 |
| | | | 104/138.1 |
| 6,311,476 B1 | 11/2001 | Frye et al. | |
| 6,373,153 B1 | 4/2002 | Hazelton et al. | |
| 6,374,746 B1 | 4/2002 | Fiske | |
| 6,418,857 B1 | 7/2002 | Okano et al. | |
| 6,502,517 B1 | 1/2003 | Groening et al. | |
| 6,510,799 B2 | 1/2003 | Lamb et al. | |
| 6,584,671 B2 | 7/2003 | Miller et al. | |
| 6,684,794 B2 | 2/2004 | Fiske et al. | |
| 6,899,036 B2 | 5/2005 | Lamb et al. | |
| 7,096,794 B2 | 8/2006 | Post | |
| 7,114,882 B1 * | 10/2006 | Friedmann | E02D 27/50 |
| | | | 405/194 |
| 7,204,192 B2 | 4/2007 | Lamb et al. | |
| 7,478,598 B2 | 1/2009 | Post | |
| 7,835,830 B2 | 11/2010 | Ellmann et al. | |
| 7,841,564 B2 | 11/2010 | Ellmann et al. | |
| 8,006,625 B2 | 8/2011 | Yang | |
| 8,118,266 B2 | 2/2012 | Zheng et al. | |
| 8,171,859 B2 | 5/2012 | Loser et al. | |
| 8,214,957 B2 | 7/2012 | Miettinen | |
| 8,250,990 B2 | 8/2012 | Kunz | |
| 8,281,723 B2 | 10/2012 | Loeser et al. | |
| 8,297,195 B2 | 10/2012 | Loser et al. | |
| 8,402,899 B2 | 3/2013 | Loeser et al. | |
| 8,430,037 B2 | 4/2013 | Miller et al. | |
| 8,430,039 B2 | 4/2013 | Zheng et al. | |
| 8,459,188 B2 | 6/2013 | Miller et al. | |
| 8,468,949 B2 * | 6/2013 | Kwon | B61B 13/08 |
| | | | 104/155 |
| 8,500,373 B1 | 8/2013 | Epps | |
| 8,534,197 B2 | 9/2013 | Miller | |
| 8,578,860 B2 | 11/2013 | Post | |
| 8,734,139 B2 | 5/2014 | Burns et al. | |
| 8,915,192 B2 | 12/2014 | Zhou | |
| 8,917,086 B2 | 12/2014 | Post | |
| 8,985,030 B2 | 3/2015 | Post | |
| 9,032,880 B2 * | 5/2015 | King | E01B 25/34 |
| | | | 104/281 |
| 9,085,304 B2 | 7/2015 | Oster | |
| 9,165,461 B1 | 10/2015 | Chu | |
| 9,221,481 B2 | 12/2015 | Desbordes et al. | |
| 9,228,298 B2 | 1/2016 | Oster | |
| 9,254,759 B1 | 2/2016 | Henderson et al. | |
| 9,290,187 B2 | 3/2016 | Dalrymple | |
| 9,290,278 B2 | 3/2016 | Dillon | |
| 9,302,577 B2 | 4/2016 | Catalan | |
| 2001/0037747 A1 | 11/2001 | Svensson | |
| 2002/0197135 A1 | 12/2002 | Arntzen et al. | |
| 2003/0205163 A1 | 11/2003 | Lamb et al. | |
| 2004/0056538 A1 | 3/2004 | Du et al. | |
| 2004/0139723 A1 | 7/2004 | Parkin | |
| 2004/0144086 A1 | 7/2004 | Wollenweber | |
| 2004/0155031 A1 | 8/2004 | Toyooka et al. | |
| 2005/0076802 A1 | 4/2005 | Pullium | |
| 2006/0032063 A1 | 2/2006 | Tomasello et al. | |
| 2006/0091347 A1 * | 5/2006 | McGuire | F16K 3/0236 |
| | | | 251/326 |
| 2006/0150858 A1 * | 7/2006 | Appleton | F16L 55/34 |
| | | | 104/138.1 |
| 2006/0233616 A1 * | 10/2006 | Friedmann | E02D 27/50 |
| | | | 405/224 |
| 2006/0235589 A1 | 10/2006 | Deng et al. | |
| 2006/0236890 A1 | 10/2006 | Lamb et al. | |
| 2007/0187556 A1 | 8/2007 | Yoshitake | |
| 2007/0192000 A1 | 8/2007 | Ellmann et al. | |
| 2007/0214994 A1 * | 9/2007 | Ardente | B62D 61/06 |
| | | | 104/138.1 |
| 2008/0236973 A1 | 10/2008 | Hahn et al. | |
| 2008/0275572 A1 | 11/2008 | Tillotson | |
| 2008/0277534 A1 * | 11/2008 | Ellmann | B60L 13/06 |
| | | | 246/167 M |
| 2009/0101040 A1 * | 4/2009 | Yang | B61B 13/10 |
| | | | 104/138.1 |
| 2009/0158955 A1 | 6/2009 | Pulliam | |
| 2010/0005997 A1 | 1/2010 | Tozoni | |
| 2010/0031846 A1 | 2/2010 | Loser et al. | |
| 2010/0083864 A1 * | 4/2010 | Flynn | B61B 13/10 |
| | | | 104/138.1 |
| 2010/0092243 A1 | 4/2010 | Bauder | |
| 2010/0115947 A1 | 5/2010 | Galbraith | |
| 2010/0143044 A1 | 6/2010 | Kadaster et al. | |
| 2010/0183407 A1 | 7/2010 | Kim | |
| 2010/0192799 A1 * | 8/2010 | Miller | B60L 13/04 |
| | | | 104/138.1 |

(56) References Cited

U.S. PATENT DOCUMENTS

| | | | |
|---|---|---|---|
| 2011/0042592 A1* | 2/2011 | Elliott | F16K 47/08 251/120 |
| 2011/0226151 A1* | 9/2011 | Pumpelly | B60L 11/00 104/118 |
| 2011/0226764 A1 | 9/2011 | Smith et al. | |
| 2011/0283914 A1 | 11/2011 | Kwon et al. | |
| 2012/0019235 A1 | 1/2012 | Post | |
| 2012/0089525 A1 | 4/2012 | Kley et al. | |
| 2012/0153744 A1 | 6/2012 | Criswell et al. | |
| 2012/0174901 A1 | 7/2012 | Post | |
| 2012/0285575 A1 | 11/2012 | Catha | |
| 2012/0299684 A1 | 11/2012 | Won | |
| 2013/0025493 A1* | 1/2013 | Friedmann | B60L 13/04 104/138.1 |
| 2013/0125779 A1* | 5/2013 | De Matias Jimenez | B61B 1/00 104/138.1 |
| 2013/0136546 A1* | 5/2013 | Friedmann | B60L 13/04 406/181 |
| 2013/0174757 A1 | 7/2013 | Post | |
| 2013/0276665 A1 | 10/2013 | Dalrymple | |
| 2014/0000473 A1 | 1/2014 | Miller | |
| 2014/0116406 A1 | 5/2014 | Post | |
| 2014/0261054 A1* | 9/2014 | Oster | E01B 25/34 104/130.02 |
| 2014/0261055 A1 | 9/2014 | Oster | |
| 2014/0354064 A1 | 12/2014 | Tseliakhovich | |
| 2016/0009196 A1 | 1/2016 | Allard | |
| 2016/0023668 A1 | 1/2016 | Shetty | |
| 2016/0033970 A1 | 2/2016 | Henderson et al. | |
| 2016/0059868 A1 | 3/2016 | Allaire | |
| 2016/0229297 A1 | 8/2016 | Finodeyev et al. | |
| 2016/0229416 A1 | 8/2016 | Bambrogan et al. | |
| 2016/0229417 A1 | 8/2016 | Bambrogan et al. | |
| 2016/0229418 A1 | 8/2016 | Bambrogan et al. | |
| 2016/0229419 A1 | 8/2016 | Brambrogan et al. | |
| 2016/0229420 A1 | 8/2016 | Coutre et al. | |
| 2016/0229427 A1 | 8/2016 | Avetian et al. | |
| 2016/0229646 A1 | 8/2016 | Bambrogan et al. | |
| 2016/0230350 A1 | 8/2016 | Bambrogan et al. | |
| 2016/0230768 A1 | 8/2016 | Bambrogan et al. | |
| 2016/0230899 A1 | 8/2016 | Cothern et al. | |
| 2016/0230915 A1 | 8/2016 | Cothern et al. | |
| 2016/0233754 A1 | 8/2016 | Dorris et al. | |
| 2016/0233809 A1 | 8/2016 | Jetti et al. | |

FOREIGN PATENT DOCUMENTS

| | | |
|---|---|---|
| WO | WO2003002370 | 1/2003 |
| WO | WO2003003389 | 1/2003 |
| WO | WO2007087028 | 8/2007 |
| WO | WO2009/135389 | 11/2009 |

OTHER PUBLICATIONS

Int'l Preliminary Report on Patentability in Int'l Appln. No. PCT/US206/0015228 (dated Aug. 8, 2017).
Musk, E., "Hyperloop White Paper," dated Aug. 12, 2013.
Wright, I., "Engineering the Hyperloop: Testing 4 Core Elements," dated Feb. 16, 2016.
Protalinski, E., "Hyperloop's intro video claims the future is now," dated Sep. 17, 2015.
GNB Corporation Product Catalog, 20 pages, (Mar. 14, 2013).
Khatait, J., et al., "Design and development of orifice-type aerostatic thrust bearing," SIMTech technical reports, vol. 6, No. 1 (Jan. 2005).
Barsikow, B., et al., "Noise Characteristics of the Transrapid TR08 Maglev System," US Department of Transportation, 338 pages (Jul. 2002).
Brecher, A., et al., "Electromagnetic Field Characteristics of the Transrapid TR08 Maglev System," US Department of Transportation, 224 pages (May 2002).
Chan, L., et al., "Vibration Characteristics of the Transrapid TR08 Maglev System," US Department of Transportation, 143 pages (Mar. 2002).
Todorovich et al., "High-Speed Rail—International Lessons for U.S. Policy Makers," Lincoln Institute of Land Policy, 64 pages (2011).
Peterman, D., et al., "The Development of High Speed Rail in the United States: Issues and Recent Events," Congressional Research Service, 35 pages (Dec. 20, 2013).
International Search Report and Written Opinion of International Searching Authority for related Application No. PCT/US2016/015231, dated Mar. 25, 2016.
International Search Report and Written Opinion of International Searching Authority for related Application No. PCT/US16/15228, dated Apr. 8, 2016.
International Search Report and Written Opinion of International Searching Authority for related Application No. PCT/US16/15215, dated Apr. 8, 2016.
International Search Report and Written Opinion of International Searching Authority for related Application No. PCT/US2016/015234, dated Apr. 4, 2016.
Barboza, D., "A New Port in Shanghai, 20 Miles Out to Sea," The New York Times, Dec. 12, 2005.
International Search Report and Written Opinion of International Searching Authority for related Application No. PCT/US2016/015221, dated Mar. 31, 2016.
International Search Report and Written Opinion of International Searching Authority for related Application No. PCT/US2016/015224, dated Apr. 11, 2016.
International Search Report and Written Opinion of International Searching Authority for related Application No. PCT/US2016/015229, dated Apr. 4, 2016.
Thornton. R., "The Future of Maglev," Magnemotion, Nov. 5, 2007.
International Search Report and Written Opinion of International Searching Authority for related Application No. PCT/US2016/015206, dated Apr. 1, 2016.
International Search Report and Written Opinion of International Searching Authority for related Application No. PCT/US2016/015236, dated Mar. 29, 2016.
International Search Report and Written Opinion of International Searching Authority for related Application No. PCT/US2016/015238, dated Apr. 1, 2016.
International Search Report and Written Opinion of International Searching Authority for related Application No. PCT/US2016/015239, dated Mar. 30, 2016.

* cited by examiner

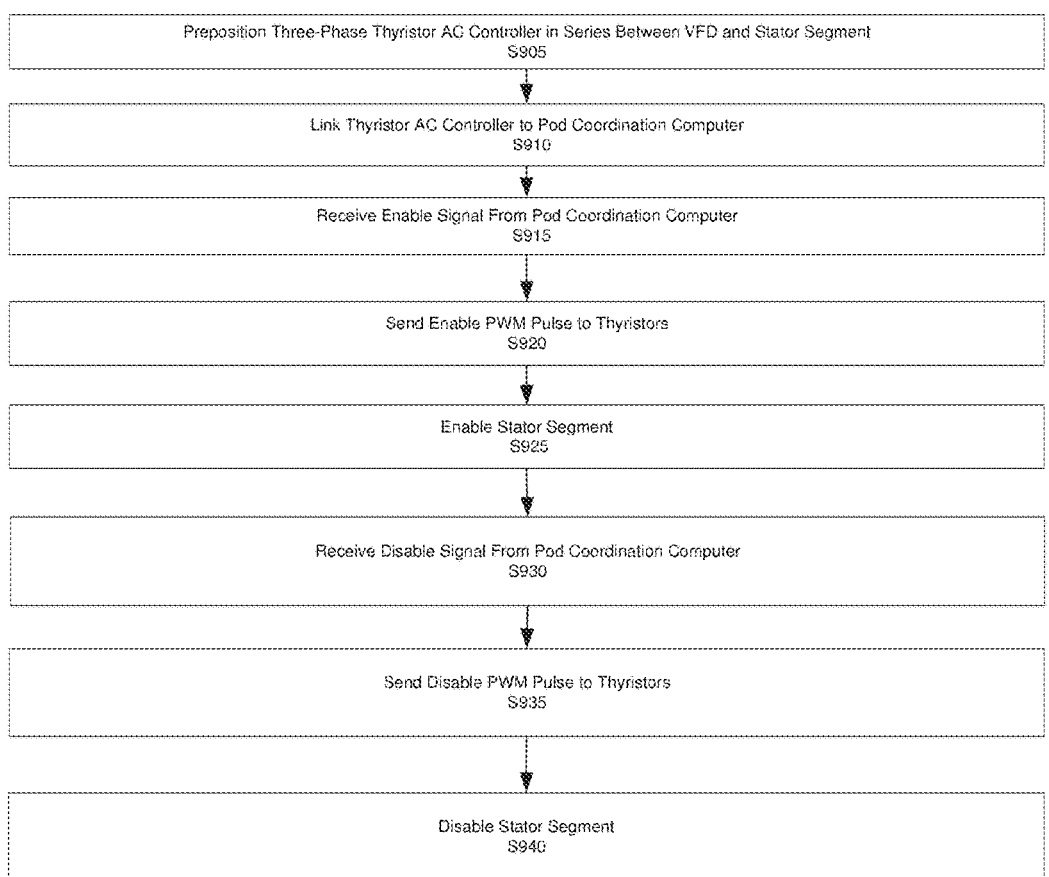

DYNAMIC LINEAR STATOR SEGMENT CONTROL

CROSS REFERENCE TO RELATED APPLICATION

The present application is a Continuation of U.S. application Ser. No. 15/008,024 filed Jan. 27, 2016, which claims the benefit of U.S. Provisional Application No. 62/254,368 filed on Nov. 12, 2015 and of U.S. Provisional Application No. 62/113,511 filed on Feb. 8, 2015, the disclosures of which are expressly incorporated by reference herein in their entireties.

BACKGROUND INFORMATION

1. Field of the Disclosure

The present disclosure relates to the field of electric motors. More particularly, the present disclosure relates to dynamic linear stator segment control for a linear electric motor for a transportation system.

2. Background Information

A linear motor is an electric motor that has had its stator and rotor "unrolled" so that instead of producing torque, it produces a linear force along its length. This can be useful for a variety of purposes including high speed transportation systems. Coils can be wound around the core in, for example, a distributed winding configuration. The combination of the coils and the core are the stator of the linear motor.

A transportation system can operate by providing external power to vehicles using a linear motor and by propelling vehicles along tracks. For a transportation system such as a commuter rail system, power can be supplied to the entire transportation system continuously.

BRIEF DESCRIPTION OF THE DRAWINGS

The novel features which are characteristic of the present systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein:

FIG. 9 is a flow chart of another process for dynamic linear stator segment control, according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1A:
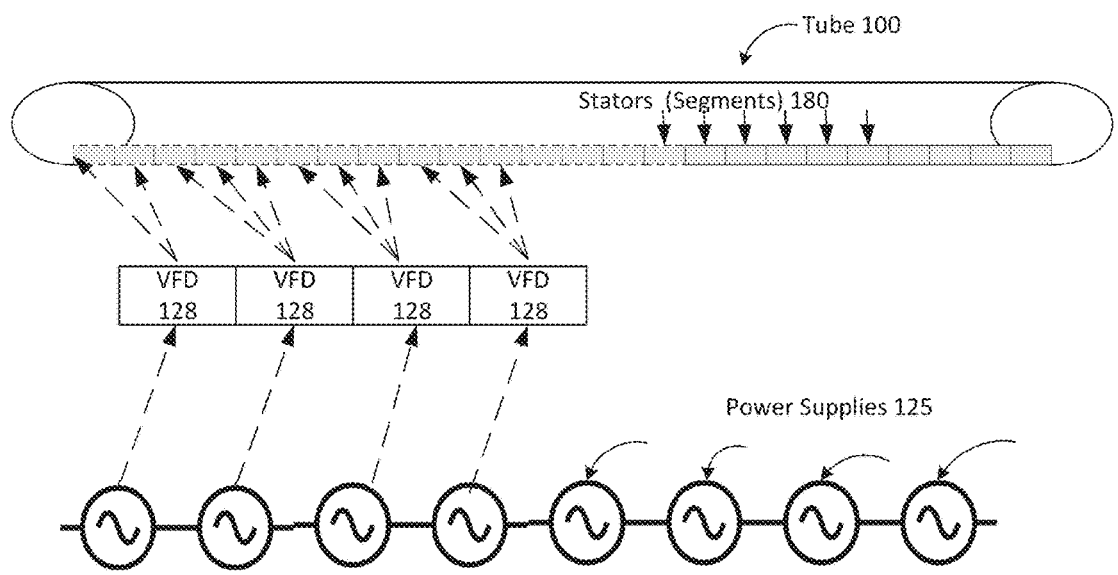
FIG. 1a is a view of a transportation system that includes stator segments for dynamic linear stator segment control, according to an aspect of the present disclosure.

FIG. 1a is a view of a transportation system that includes stator segments for dynamic linear stator segment control, according to an aspect of the present disclosure. In FIG. 1, tube 100 is analogous to a subway tunnel, or a tube within which transportation pods can travel. As such, the tube 100 may be dozens or even hundreds of kilometers long, and on the order of 25-250 feet in diameter. Additionally, the tube 100 may have a circular profile, but the profile of the tube 100 may also be in other shapes such as an ellipse or a rectangle. One example of such a system is disclosed in commonly assigned U.S. patent application Ser. No. 15/007,783 filed on even date herewith and entitled "Transportation System", the entire contents of which are expressly incorporated by reference herein in their entirety.

An electromagnetic system powers pods 198 that move through the tube 100. The electromagnetic system may include magnets 199 provided on each pod 198 and serving as rotors. The electromagnetic system also includes aligned stator segments 180 placed in portions of the tube where the pods 198 are to be accelerated. The aligned stator segments 180 may include interlocked blocks of windings as described in commonly assigned U.S. patent application Ser. No. 15/007,940 filed on even date herewith and entitled "Continuous Core for Electric Motors", the entire contents of which are expressly incorporated by reference herein in their entirety.

The electromagnetic system works as a linear motor to generate a force that is proportional to both the current running through the stator and the magnetic field of the rotor. The force itself is produced by induction which produces a magnetic field opposite to the magnetic field of the rotor. The opposing fields repel each other, and these forces act to propel the pod 198 and rotor through the tube 100.

The tube 100 may be depressurized (vacuumed) in a way that reduces resistance encountered by the pods 198 as they move through the tube 100. In this way, pods 198 may achieve faster speeds or the same speed with less power, using the electromagnetic system that includes the aligned stator segments 180 and the rotors carried by the pods 198. That is, pods 198 will require less propulsion force to obtain a given speed using the electromagnetic system that includes the aligned stator segments 180 and the rotors carried by the pods 198.

In FIG. 1, variable frequency drives (VFD) 128 vary the amplitude and frequency of the voltage applied to the stator segments 180. The alternative current (AC) power itself is supplied by power supplies 125. Power supplies 125 are representative of a power grid, and may derive power from power stations, solar panels and other forms of power that can be placed on the power grid. The variable frequency driver 128 drives power supplies 125 dynamically to provide electric power to stator segments 180.

The variable frequency drive 128 drives the power supplies 125 in a synchronized pattern. The stator segments 180 are powered as a pod 198 approaches, and depowered as a pod 198 departs. Therefore, stator segments 180 are powered in a synchronized manner that reflects the actual relative location of the pod 198 to each stator segment 180. The actual location of the pod 198 may be determined in a variety of manners including use of fixed sensors in the tube 100 that detect the presence of a pod 198 at a specific location in the tube 198.

Presence of a pod 198 at a specific location within a tube 100 can also be projected. For example, knowledge of the location of a pod 198 at a specific location and time can be combined with known acceleration characteristics of the linear motor within the tube 100 to project when the pod 198 will be at a specific location within the tube 100. Moreover, since the acceleration characteristics of the linear motor within the tube 100 are expected to remain the same over time, a plot of the trajectory and timing of a pod 198 in the tube 100 can be generated. Therefore, as long as the starting time for a pod 198 is known, a trajectory from start to finish can be used as a timing plan for the pod 198. In this way, the presence of the pod 198 at different times at hundreds or even thousands of different stator segments 180 within the tube can be projected.

The relative proximity of a pod 198 to a particular stator segment 180 can also involve a combination of detected locations of the pod and projections based on the detected locations. For example, a sensor may be placed at spaced locations, e.g., every 10 stator segments 180, and the detected presence of the pod 198 at a sensor can then be used to project the presence of the pod 198 at each of the additional stator segments 180. Alternatively, a plan may be provided before a pod 198 ever starts a journey through the tube 100, and the plan may plot the location and time of the pod at every stator segment 180 within a tube 100. When a plan is used, presence and speed of the pod 198 at specific locations within the tube 100 can be compared to the plan in order to account for any discrepancies between the plan and the actual positions of the pod 198 within the tube 100.

A plan can be generated in several ways. One way to generate a plan is to propel a pod 198 through a tube 100 and plot positions of the pod 198 within the tube at specific times. Another way to generate a plan is to identify acceleration characteristics of the linear motor, such as the force to be generated and the expected mass of a pod 198 to be propel led through the pod. Knowledge of the acceleration characteristics of the linear motor can be used to generate a plan that plots the position of the pod 198 within the tube 100 at different times relative to the absolute starting time of the pod. In this way, the same plan can be used over and over, and a process of synchronizing the power to stator segments can be automatically performed by a computer and a set of variable frequency driers 128.

Figure 1B:
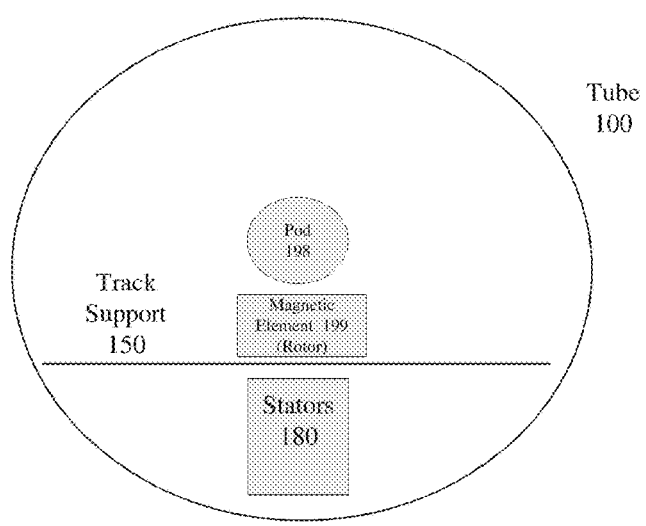
FIG. 1b is a frontal schematic view of a transportation system that includes stator segments for dynamic linear stator segment control, according to an aspect of the present disclosure.

FIG. 1*b* is a frontal schematic view of a transportation system that includes stators (180) for a dynamic linear stator segment control, according to an aspect of the present disclosure. In FIG. 1*b*, the tube 100 includes a track support 150 and stators 180. The stators 180 include interconnected blocks of windings, and are linked together by, e.g., joints, in sections of the tube 100 where pods are to be accelerated by the linear motor.

In FIG. 1*b*, the pod 198 is shown as separate from the magnetic element 199 (rotor). However, the magnetic element 199 may be a component of the pod 198. Regardless, the magnetic element 199 moves with the pod 198 through the tube 100, and serves as a rotor of the linear motor described herein. In this way, electromagnetic force can be dynamically generated as the pod 198 moves through the tube 100. The features of the present disclosure mainly relate to how power is selectively provided to the stator segments 180.

The track support 150 is shown as a horizontal line in FIG. 1*b*, but may have a variety of configurations relative to the stator segments 180 described herein (see commonly assigned U.S. Patent Application Ser. No. 15/007,783, incorporated by reference above). For example, the stator segments 180 can be installed under a track support 150, on top of a track support 150, between two components of a track support 150, or next to one component of a track support 150. In one embodiment, the track support 150 may include a single vertical guiding track installed at, for example, the center of the bottom of the tube 100, and blocks of windings may be aligned parallel to the guiding track as a series of stator segments 180 aligned in series. Power is supplied to the stator segments 180 in order to generate voltage that works together with the magnetic element 199 to produce an electromagnetic force that propels the pods 198 through the tube 100. In this way, the magnetic elements 199 and stator segments 180 form a linear motor.

Medium Voltage (MV) is defined by the Institution of Electrical and Electronic Engineers (IEEE) as 1 kV to 100 kV. In an embodiment of the present disclosure, voltages up to 8410 volts are applied to the core of the stator of the linear motor.

Figure 2:
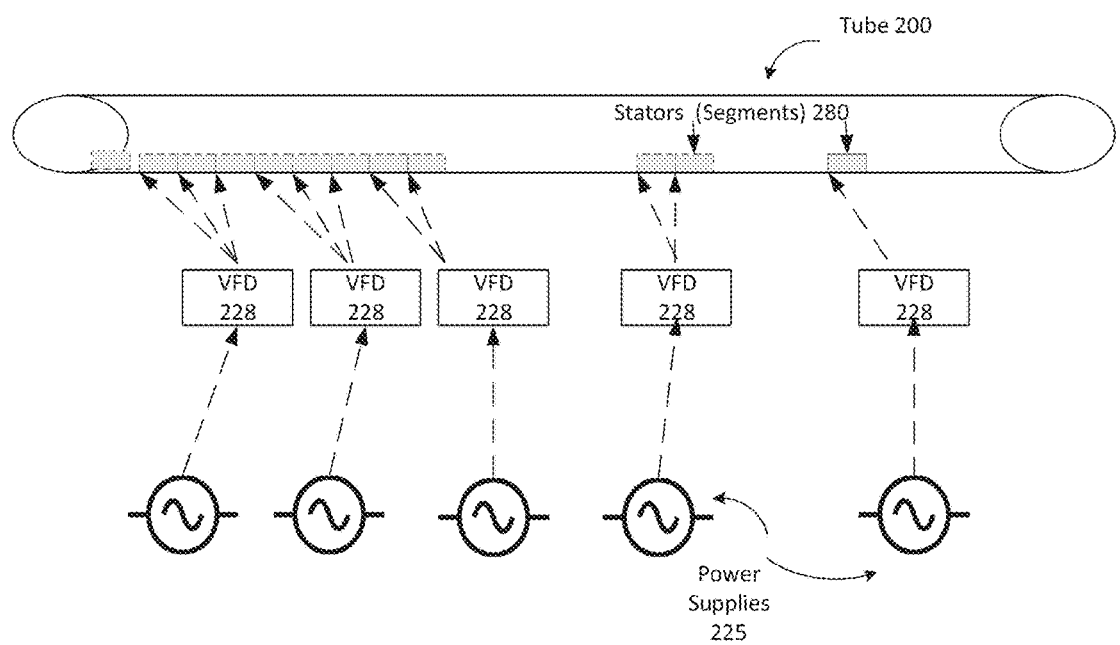
FIG. 2 is a view of another transportation system that includes stator segments for dynamic linear stator segment control, according to an aspect of the present disclosure.

FIG. 2 is a view of another transportation system that includes stator segments for dynamic linear stator segment control, according to an aspect of the present disclosure. In the embodiment of FIG. 2, stator segments 280 are shown placed at some portions of the tube 200 but not at others. In FIG. 2, stator segments are selectively placed where pods are to be accelerated or de-accelerated, but need not be placed at numerous other locations along the tube 200. The largest concentration of stator segments 280 is placed at the leftmost portion of the tube 200, as this portion is where a pod is to be accelerated from 0 to a maximum intended speed. Stator segments may also be placed to the right to boost or reaccelerate the pods to compensate for any deceleration due to air flows in the tube 200 or friction caused by contact with track supports or other elements in the tube 200. Of course, stator segments may be used also to de-accelerate a pod, and may even be placed along the tube 200 specifically for the purpose of de-acceleration in locations where acceleration will not normally be provided.

In FIG. 2, variable frequency drives 228 and power supplies 225 are placed only where stator segments 280 are placed in the tube 200. As such, variable frequency drives 228 and power supplies 225 need not be placed along areas of the tube 200 where stator segments 280 are not required and acceleration or de-acceleration of pods is not anticipated.

Figure 3:
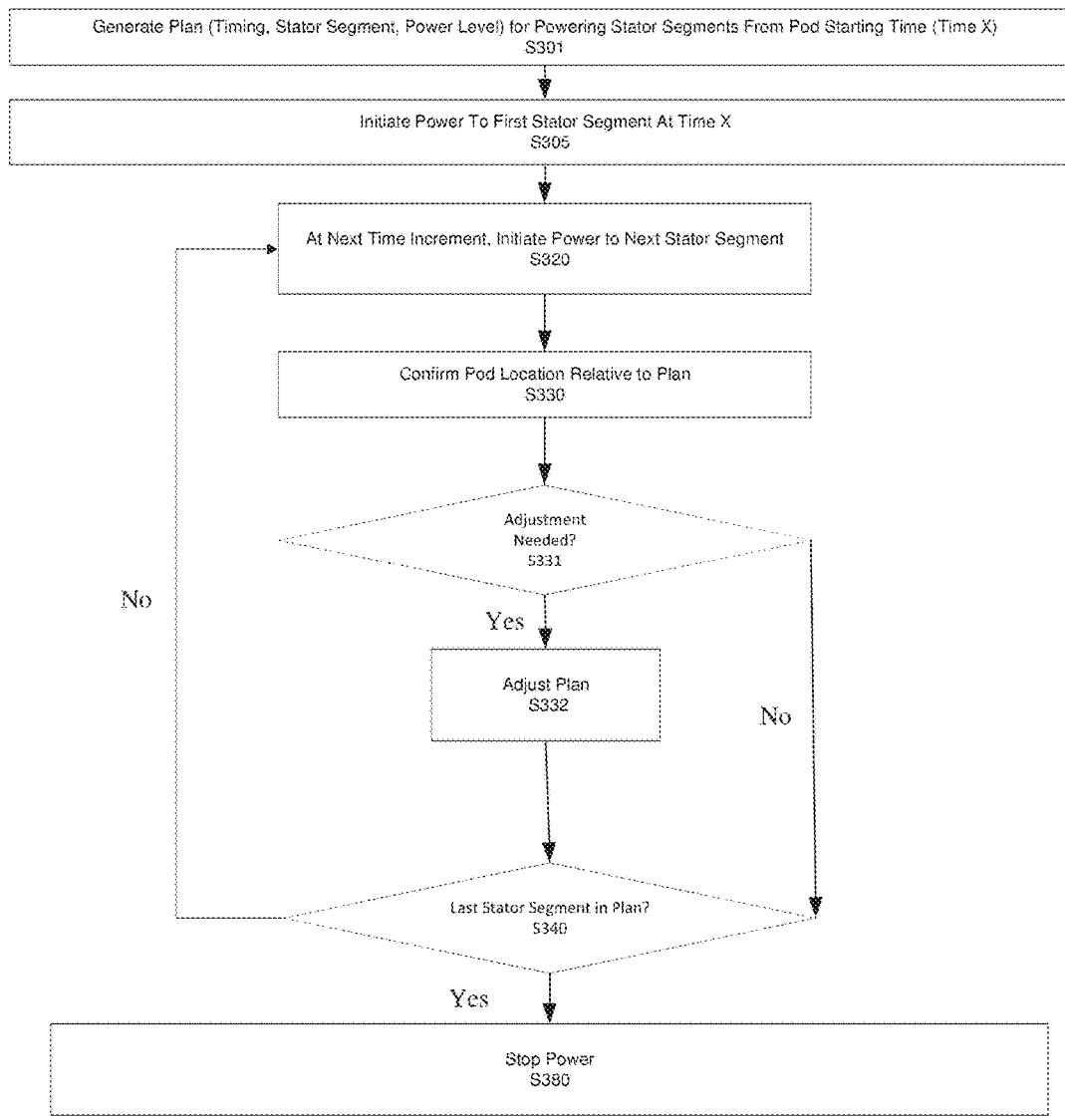
FIG. 3 is a flow chart of a process for dynamic linear stator segment control, according to an aspect of the present disclosure.

FIG. 3 is a flow chart of a process for dynamic linear stator segment control, according to an aspect of the present disclosure. At S301, a plan is generated for powering stator segments from the moment a pod starts to travel through a tube. A plan may specify the sequence of stator segments, such as #1, #2, #3, etc. The plan may also specify the time starting from 0 when the pod is expected to reach each stator segment. The plan may also specify the power level to be provided to each stator segment via the variable frequency drives. At S305, power is initiated to the first stator segment at the starting time.

At S320, power is initiated to the next stator segment at the next time increment. A "time increment" in FIG. 3 may be a constant unit of time, such as seconds or milliseconds, but can also be an amount that is not constant. The amount of time for a pod to travel from one stator segment to another may vary even when stator segments are of a uniform size and evenly spaced. The variance in time periods will reflect the acceleration of the pod caused by the stator segments. In any event, the plan generated at S301 will account for how long a pod is expected to take to reach each stator segment, and the "time increment" at S320 is the incremental amount of time required for the pod to travel from one stator segment to the next.

At S330, the pod location is confirmed relative to the plan. That is, the pod is supposed to be at a particular place at a particular time at all times when travelling when the plan is generated at S301. At S330, confirmation is made that the pod is where it is supposed to be relative to the stator segment being powered.

At S331, a determination is made as to whether an adjustment is needed. An adjustment is to change the plan to account for any offset between where the pod is and where the pod is supposed/projected to be. Since the plan and adjustments are used to control power to stator segments at S320, the timing for powering stator segments is adjusted, and not just, e.g., power levels.

If adjustment is needed (S331=Yes), at S332, the plan is adjusted by offsetting times on the plan. If adjustment is not needed (S331=No), or otherwise after the plan is adjusted at S332, the process includes determining whether the stator segment to which power was initiated is the last stator segment in the plan. If the stator segment is the last stator segment in the plan (S340=Yes), power is stopped at S380. If the stator segment is not the last segment in the plan (S340=No), the process returns to S320. At S320 and at the next time increment in the plan, power is initiated to the next stator segment and the process repeats through S340/S380.

In FIG. 3, stator segments can be incrementally turned on and off as a pod approaches and departs. Adjacent stator segments can be turned on at the same time that previous stator segments are turned off, or the time in which stator segments are powered may overlap either partially or fully. The powering of stator segments can be synchronized so that even if several stator segments are powered at the same time, a new stator segment ahead of the pod is provided power as power is shut off to the last powered stator segment behind the pod.

Figure 4:
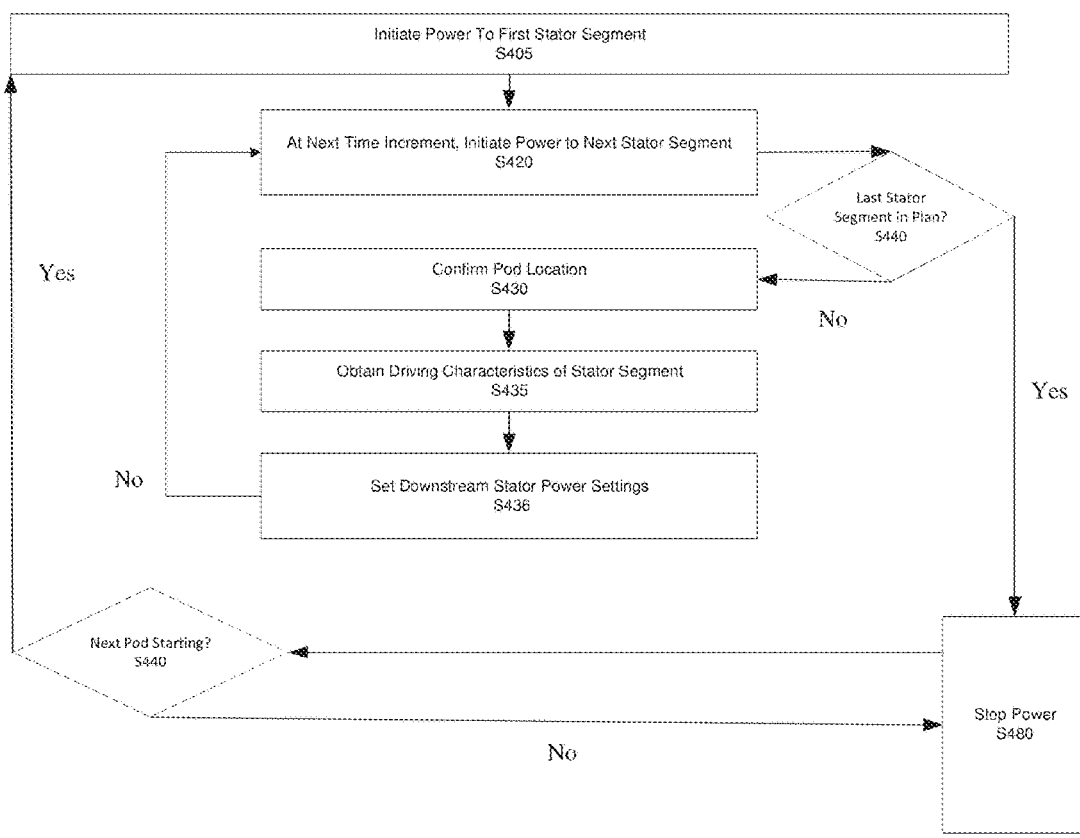
FIG. 4 is another flow chart of a process for dynamic linear stator segment control, according to an aspect of the present disclosure.

FIG. 4 is another flow chart of a process for dynamic linear stator segment control, according to an aspect of the present disclosure. At S405, power is initiated to the first stator segment. At S420, at the next time increment, power is initiated to the next stator segment. At S440, a determination is made whether the stator segment is the last stator segment in the plan. If the stator segment is the last stator segment in the plan (S440=Yes), power is stopped at S480. Otherwise, if the stator segment is not the last stator segment in the plan (S440=No), the pod location is confirmed at S430.

Diving characteristics of the stator segment are obtained at S435. As described herein, driving characteristics can include at least frequency, phase, voltage level/current level, start time, and end time. At S436, downstream stator power settings are set for downstream stators based on the driving characteristics of the stator segment obtained at S435. This process includes passing off control from one variable frequency drive 128, 228 to another as the pod 198, 298 passes through the tube 100, 200. When it is required to have variable frequency drives 128, 228 sequentially pass off control of the pod with the rotor, the variable frequency drive 128, 228 currently controlling power supply to stator segments communicates the current phase and frequency to the upstream drives that will assume control of the power supply to upstream stator segments. This may be particularly important if the variable frequency drives 128, 228 are utilizing sensor-less control.

The upstream variable frequency drives use the information to augment an estimate of the required frequency and phase for the power output to the stator segments powered by the upstream variable frequency drives. The frequency and phase for the output are configurable parameters that allow for adjustment so that frequency and phase for an upstream segment driven by an upstream variable frequency drive starts where the frequency and phase for a downstream segment driven by a downstream variable frequency drive ended.

The drives can also share information such as current and voltage for each phase. Current and voltage information can be used to coordinate the currents that the drives are providing. The total current from all active drives and, by extension, the force being experienced by the rotor, can be controlled by sharing this information.

As set forth above, a frequency and phase for power to a stator segment be set for an incoming pod. The frequency and phase can be matched between different variable frequency drives, so that the frequency and phase for a stator segment controlled by the last variable frequency drive can be matched to the frequency and phase for a stator segment controlled by the next variable frequency drive. The matching will vary based on the timing of when the handoff will occur, and the timing in turn depends on the relative proximity of the pod, the speed of the pod, and the acceleration expected between the current position and the targeted stator segment.

Information may be passed between more than two variable frequency drives. For example, a computer can coordinate and synchronize frequency and phase passing between different variable frequency drives for a tube that stretches hundreds of kilometers. The current drive can pass phase and frequency information along with position/location information to all upstream drives or simply to the coordinating computer. The upstream drives have parameters that allow use of the information from downstream drives in determining appropriate phase and frequency settings.

The upstream drives can also include information that be used to estimate the accuracy and veracity of phase and frequency estimates. The upstream drives can have parameters that allow using this information in determining how to weigh internal estimates of the appropriate phase and frequency. The upstream drives communicate back to the downstream drives the estimates of phase and frequency, with an estimate of uncertainty.

As described, controlling phase and frequency of a second drive relative to a first drive can be useful. For example, matching phase and frequency can have a positive effect on motor performance. The mechanisms facilitate use of a phase-lock-loop, and help avoid wasting time and track resources just in obtaining information. Overall, a seamless transfer between variable frequency drives helps maximize average acceleration provided by stator segments of the linear motor, thus helping to reduce the required length of track with stators, number of stator blocks, the amount of switches, the amount of variable frequency drives. This also helps reduce the variation in accelerations, which minimizes jerk experienced by a rotor and a payload.

Positions and velocities of the pods can be identified by sensors such as velocity sensors placed at fixed locations within a tube. The position and velocity information can be used to help drives directly measure the appropriate phase and frequency. The sensor can be continuously filtered to eliminate startup transients in position and velocity estimates when transfer takes place. The estimates could be made by individual drives, or by one drive that shares the estimate with other drives, or by a separate coordinating computer that coordinates and synchronizes power control by multiple different variable frequency drives.

Figure 5:
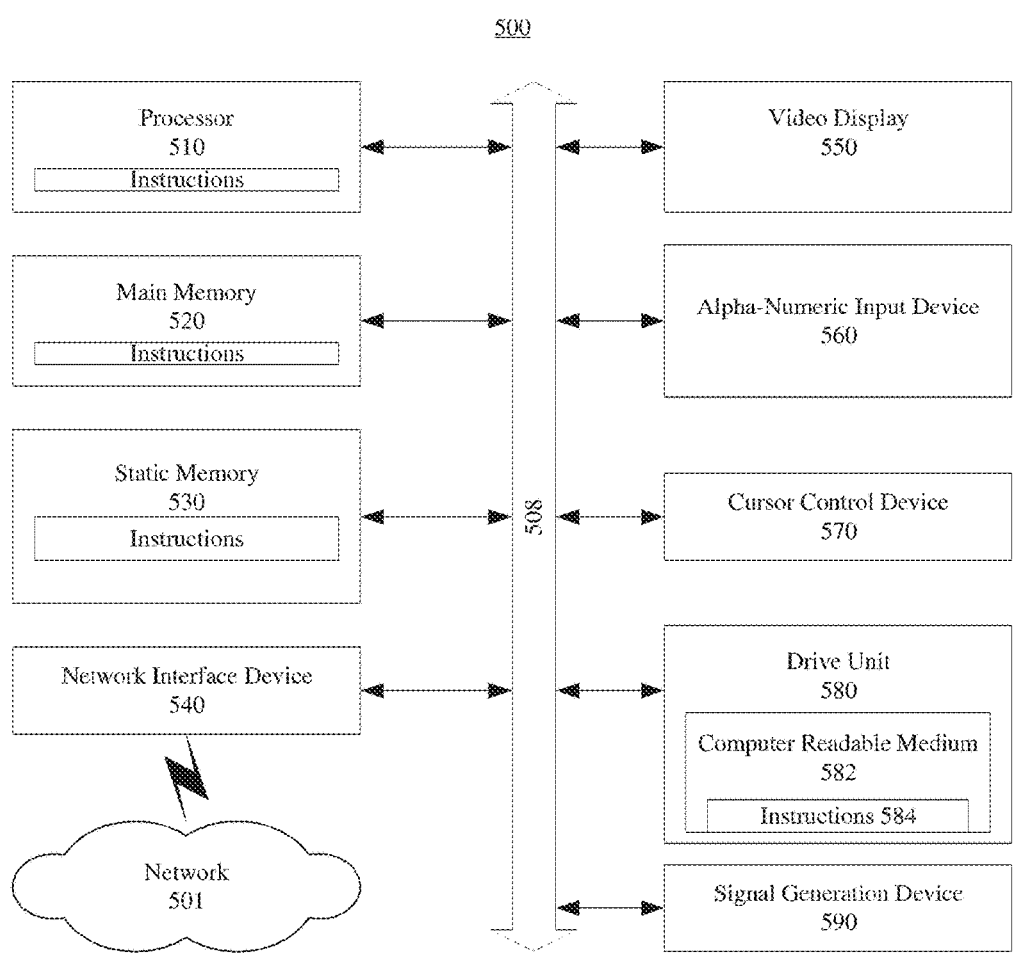
FIG. 5 is an exemplary general computer system that includes a set of instructions for dynamic linear stator segment control, according to an aspect of the present disclosure.

In the process of FIG. 4, after the downstream stator power settings are set at S436, at the next time increment power is initiated to the next stator segment at S420 again. The process repeats until the last stator segment the plan is reached at S440 (S440=Yes) and the power is stopped at S480. The process starts again when confirmation is made that a next pod is starting FIG. 5 is an illustrative embodiment of a general computer system, on which a method of dynamic linear stator segment control can be implemented, and which is shown and is designated 500. The computer system 500 can include a set of instructions that can be executed to cause the computer system 500 to perform any one or more of the methods or computer based functions disclosed herein. The computer system 500 may operate as a standalone device or may be connected, for example, using a network 501, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a portable telephone, a control system, a camera, a sensor, a coordinating computer, a variable frequency drive, or any other machine capable of executing a set of instructions (sequential or otherwise) that specify actions to be taken by that machine. The computer system 500 can be incorporated as or in a particular device that in turn is in an integrated system that includes additional devices. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 includes a processor 510. A processor for a computer system 500 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 500 is configured to execute software instructions in order to perform functions as described in the various embodiments herein. A processor for a computer system 500 may be a general purpose processor or may be part of an application specific integrated circuit (ASIC). A processor for a computer system 500 may also be a microprocessor, a microcomputer, a processor chip, a controller, a microcontroller, a digital signal processor (DSP), a state machine, or a programmable logic device. A processor for a computer system 500 may also be a logical circuit, including a programmable gate array (PGA) such as a field programmable gate array (FPGA), or another type of circuit that includes discrete gate and/or transistor logic. A processor for a computer system 500 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 500 includes a main memory 520 and a static memory 530 that can communicate with each other via a bus 508. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 500 may further include a video display unit 550, such as a liquid crystal display (LCD), an organic light emitting diode (OLED), a flat panel display, a solid state display, or a cathode ray tube (CRT). Additionally, the computer system 500 may include an input device 560, such as a keyboard/virtual keyboard or touch-sensitive input screen or speech input with speech recognition, and a cursor control device 570, such as a mouse or touch-sensitive input screen or pad. The computer system 500 can also include a disk drive unit 580, a signal generation device 590, such as a speaker or remote control, and a network interface device 540.

In a particular embodiment, as depicted in FIG. 5, the disk drive unit 580 may include a computer-readable medium 582 in which one or more sets of instructions 584, e.g. software, can be embedded. Sets of instructions 584 can be read from the computer-readable medium 582. Further, the instructions 584, when executed by a processor, can be used to perform one or more of the methods and processes as described herein. In a particular embodiment, the instructions 584 may reside completely, or at least partially, within the main memory 520, the static memory 530, and/or within the processor 510 during execution by the computer system 500.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 582 that includes instructions 584 or receives and executes instructions 584 responsive to a propagated signal; so that a device connected to a network 501 can communicate voice, video or data over the network 501. Further, the instructions 584 may be transmitted or received over the network 501 via the network interface device 540.

A coordinating computer as described herein may include the features shown in FIG. 5. Such a coordinating computer can coordinate phase and frequency for variable frequency drives that provide power to different stator segments aligned in, e.g., a large transportation system. Additionally, such a coordinating computer can coordinate and limit current provided to the stator segments so as to control the force that is generated to propel the pod as it moves through the tube.

Figure 6:
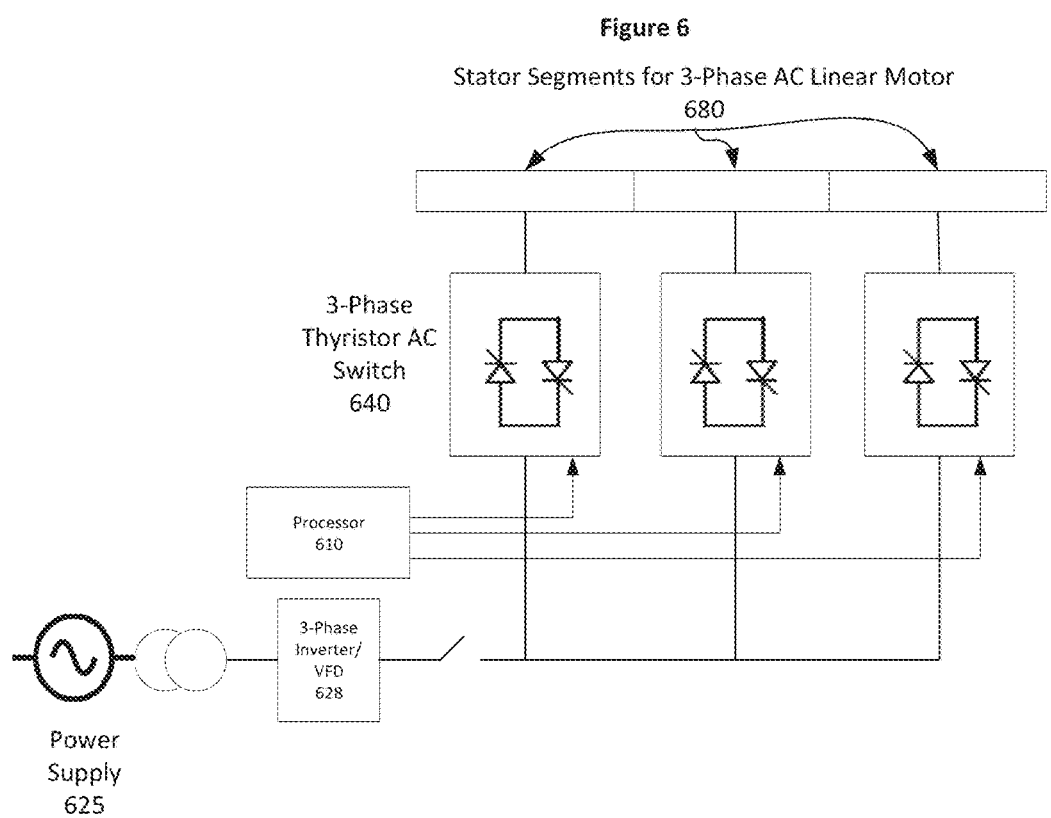
FIG. 6 is a system that includes a circuit for dynamic linear stator segment control, according to an aspect of the present disclosure.

FIG. 6 represents a system that includes a circuit for dynamic linear stator segment control, according to an aspect of the present disclosure. In FIG. 6, stator segments 680 are shown along with power supplies 625 and three-phase inverter/variable frequency drive 628. The stator is stationary, and power is selectively provided to stator segments 680 when a rotor is approaching and moving across the stator segments. That is, at times certain stator segments in the proximity of a pod are selectively switched ON, and the remaining stator segments are switched OFF.

Vacuum contactors can be used to switch each stator segment. Vacuum contactors take typically 30-50 ms to close and 80-100 ms to open. The lifetime of a vacuum contactor is usually limited to a few hundreds of thousands of cycles of operation, e.g., 200,000 cycles. As a result, in FIG. 6, medium voltage thyristors are used to provide greater durability. The medium voltage thyristors are rated up to 8.5 kV and 3000 A. A typical turn time of a medium voltage thyristor is less than 0.2 ms, so that a medium voltage thyristors in FIG. 6 provides fast and reliable switching for power to stator segments.

In FIG. 6, a three-phase thyristor AC switch 640 is placed in series between a variable frequency drive (VFD) and the linear stator segment. The thyristor AC switch 640 receives an enable/disable signal from processor 610, based on the speed and position of the rotor/pod. The enable/disable signal controls the ON/OFF PWM pulses to all thyristors in the three phases. Multiple three-phase AC switches 640 can be placed in a daisy chain for consecutive stator segments. The thyristors of the three-phase thyristor AC switch turn OFF when the variable frequency drive 628 ramps down the voltage and consequently the current in the three phases. Therefore, FIG. 6 provides for a mechanism to power ON and OFF each stator segment of a long stator in a linear motor in medium voltage applications using thyristors.

Figure 7:
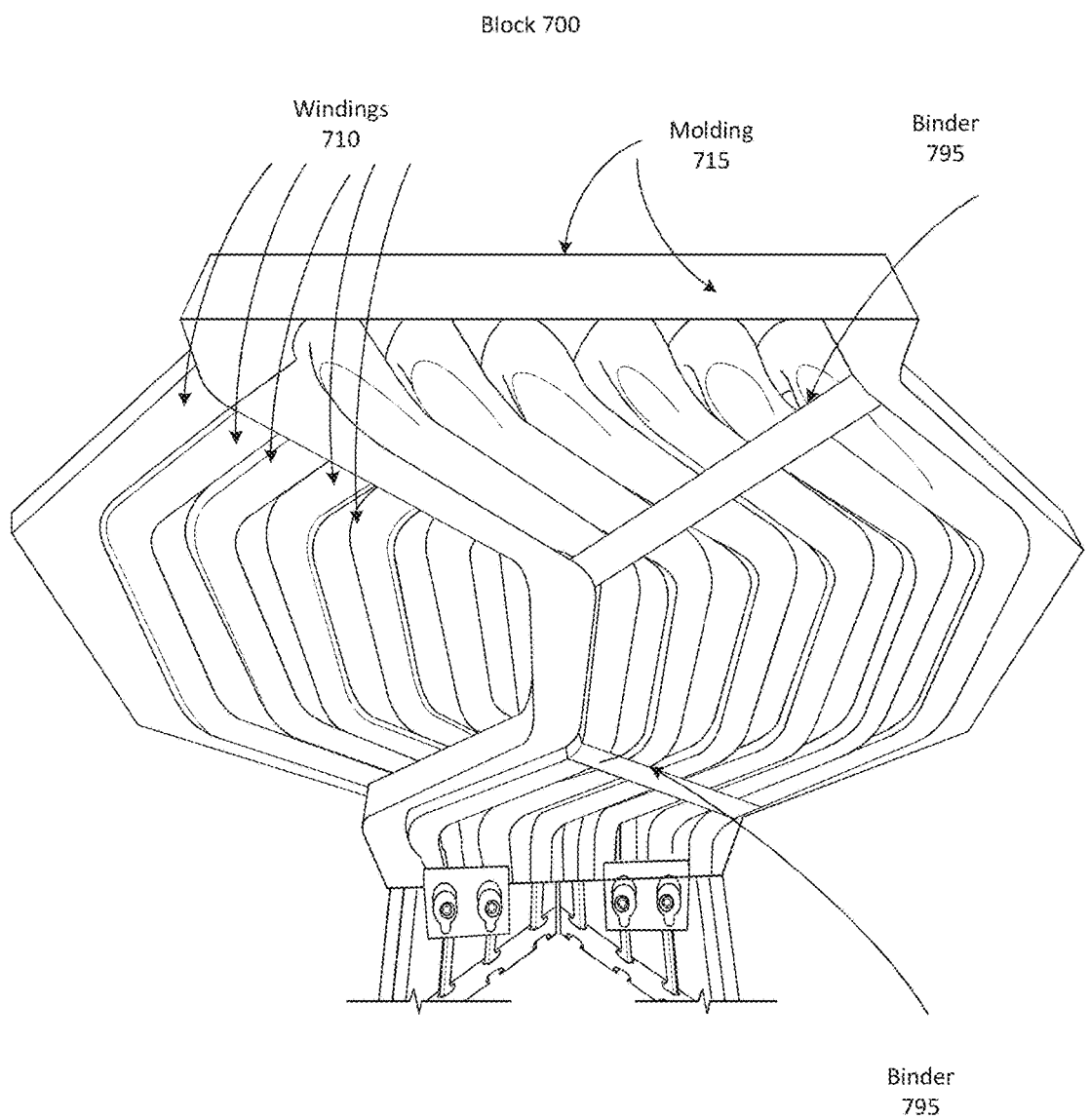
FIG. 7 is a stator block for dynamic linear stator segment control, according to an aspect of the present disclosure.

FIG. 7 is a stator block for dynamic linear stator segment control, according to an aspect of the present disclosure. FIG. 7 is an example of a stator that includes multiple windings 710 that are molded together using molding 715 to form a block 700. Multiple such stator blocks 700 can be linked together with joints so as to form a magnetically continuous stator. The linked stator blocks 700 can be aligned in a tube of a transportation system as part of a linear motor used to propel/accelerate (and/or de-accelerate) pods through the tube. An example of blocks of windings is described in commonly assigned U.S. Patent Application No. Ser. No. 15/007,940, filed on even date herewith and entitled "Continuous Core for Electric Motors", the entire contents of which are expressly incorporated by reference herein in their entirety.

Figure 8:
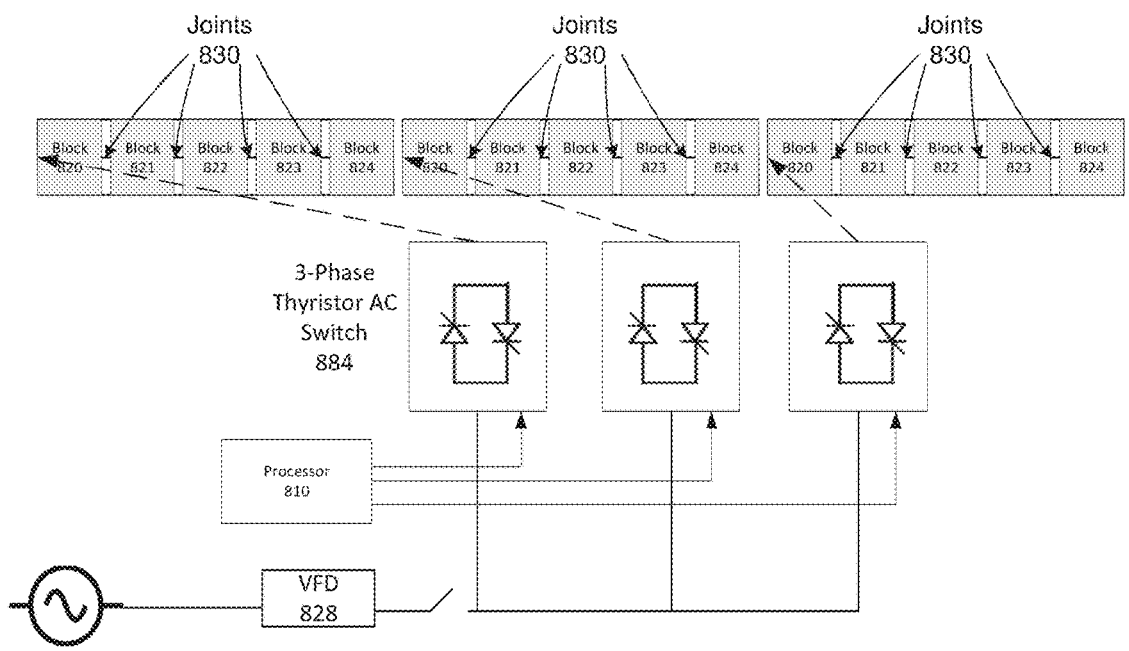
FIG. 8 is another system that includes a circuit for dynamic linear stator segment control, according to an aspect of the present disclosure.

FIG. 8 is another system that includes a circuit for dynamic linear stator segment control, according to an aspect of the present disclosure. In FIG. 8, blocks 820-824 are joined by joints 820 to form three separate stator segments. Power to the stator segments is switched on and off by the three-phase thyristor AC switch 884, under the control of the processor 810. Power is supplied by a power source via variable frequency drive 828. In FIG. 8, the processor 810 collects information about the relative proximity of a pod to the stator segments, and determines when to enable power to the stator segments. As described above, the processor 810 can also collect information from variable frequency drives 828 in order to synchronize, e.g., frequency and phase in handoffs between variable frequency drives as the pod travels through the tube.

FIG. 9 is a flow chart of another process for dynamic linear stator segment control, according to an aspect of the present disclosure. In FIG. 9, a three-phase thyristor AC controller is prepositioned in series between a variable frequency drive and a stator segment at S905. The three-phase thyristor controller can be installed at the same time the stator segments are installed, prior to any pod being propelled through the tube. At S910, the thyristor AC controller is linked to a pod coordination computer at S910.

At S915, an enable signal is received from the pod coordination computer, and at S920, PWM signals (pulses) are sent to the gate of the thyristors to enable power to a stator segment at S925. At S930, a disable signal is received from a pod coordination computer. At S935, PWM signals are disabled and PWM pulses are not sent to the gate of the thyristors, and at S940, the power to the stator segment is disabled.

As described above, the enable and disable signals can be synchronized with the location and velocity of a pod being propelled through a tube. By properly synchronizing the timing, phase and frequency of the power supplied to stator segments of a linear motor, the pod is smoothly accelerated by the linear motor.

Although a dynamic linear stator segment control has been described with reference to several exemplary embodiments, it is understood that the words that have been used are words of description and illustration, rather than words of limitation. Changes may be made within the purview of the appended claims, as presently stated and as amended, without departing from the scope and spirit of a dynamic linear stator segment control in its aspects. Although a dynamic linear stator segment control has been described with reference to particular means, materials and embodiments, a dynamic linear stator segment control is not intended to be limited to the particulars disclosed; rather a dynamic linear stator segment control extends to all functionally equivalent structures, methods, and uses such as are within the scope of the appended claims.

Although the present specification describes components and functions that may be implemented in particular embodiments, the disclosure is not limited to such components, functions and embodiments.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a method for controlling a dynamic linear motor includes determining a relative proximity of a moving rotor of the linear motor to a fixed stator segment of the linear motor using a current location of the moving rotor. The method includes determining a current driving characteristic of the linear motor at the current location of the moving rotor. The method further includes identifying, based on the current driving characteristic of the linear motor, settings for the fixed stator segment when the moving rotor reaches the fixed stator segment. The fixed stator segment is driven based on the settings when the moving rotor reaches the fixed stator segment.

According to another aspect of the present disclosure, the current location of the moving rotor is known from a predetermined location of another fixed stator segment of the linear motor at the current location of the moving rotor.

According to yet another aspect of the present disclosure, the settings for the fixed stator segment include a starting phase and frequency for driving a coil segment when the moving rotor reaches the fixed stator segment.

According to still another aspect of the present disclosure, the current driving characteristic of the linear motor comprises a current phase and frequency of another fixed stator segment at the current location of the moving rotor.

According to another aspect of the present disclosure, the current phase and frequency are of a variable frequency drive being used to drive the said another fixed stator segment at the current location of the moving rotor.

According to another aspect of the present disclosure, different variable frequency drives are used to drive the fixed stator segment and the other fixed stator segment. The current phase and frequency of the variable frequency drive used to drive the other fixed stator segment at the current location are used to coordinate settings of another variable frequency drive used to drive the fixed stator segment.

According to still another aspect of the present disclosure, the method includes instructing a variable frequency drive to drive the fixed stator segment based on the settings when the rotor reaches the fixed stator segment.

According to another aspect of the present disclosure, a controller determines the relative proximity and the current characteristic, and identifies the settings. The controller further coordinates driving of multiple variable frequency drives distributed along a transportation system at includes the fixed stator system.

According to another aspect of the present disclosure, the relative proximity is determined using a location identified by a fixed sensor.

According to an aspect of the present disclosure, a transportation system includes a tube through which pods move using force generated electromagnetically and a plurality of fixed stator segments installed along the tube. The transportation system also includes a drive that coordinates power supply to the fixed stator segments so that fixed stator segments are powered as a pod approaches based on identification of a relative proximity between the pod and the fixed stator segments, and so that power to the fixed stator segments is terminated after the pod passes the fixed stator segments.

According to another aspect of the present disclosure, the interior of the tube is substantially vacuumed. The pods are guided through the tube using at least one rail that extends through a part of the tube.

According to yet another aspect of the present disclosure, the fixed stator segments are components of a linear motor that also includes a magnet that serves as a rotor and is carried by a pod.

According to still another aspect of the present disclosure, the transportation system also includes a variable frequency drive that coordinates characteristics of the fixed stator segments to match phase and frequency. The fixed stator segments are driven by the variable frequency drive.

According to another aspect of the present disclosure, power is supplied to fixed stator segments from power sources that are dynamically controlled based on positions of the pod as the pod moves through the fixed tube.

According to another aspect of the present disclosure, the transportation system also includes a three-phase thyristor alternating current switch that connects power supply to the fixed stator segments.

According to still another aspect of the present disclosure, the transportation system also includes a computer processor that sends enable and disable signals to the three-phase thyristor to selectively enable the thyristor to supply power to the fixed stator segments.

According to another aspect of the present disclosure, the transportation system also includes sensors that detect the position of a pod that carries the moving rotor. The computer processor determines the relative proximity of the moving rotor to the fixed stator segments using information received from the sensors.

According to still another aspect of the present disclosure, the computer determines a current driving characteristic of the linear motor at the current location of the moving rotor and identifies, based on the current driving characteristic of the linear motor, settings for a fixed stator segment when the moving rotor reaches the fixed stator segment.

Embodiments of the invention are directed to a method for controlling a dynamic linear motor. The method includes defining a path over which a rotor is to travel, placing stator segments at least along portions of the path where the rotor may be one of accelerated and decelerated and supplying a variable amplitude and frequency of voltage to power the stator segments in a synchronized manner so that, as the rotor approaches stator segments, the stator segments are powered and, as the rotor departs stator segments, the stator segments are depowered.

In embodiments, a stator segment can include at least one block of windings.

According to other embodiments, a stator segment can include interconnected blocks of windings.

In accordance with still other embodiments, a distance between successive stator segments along the path may not be uniform.

In embodiments, the synchronized manner in which the power is supplied to the stator segments may correspond to a relative location of the rotor to the stator segments. Embodiments of the method can also include determining an actual location of the rotor via sensors fixed at specific locations along the path. Embodiments of the method can also include projecting when the rotor will be at specific locations along the path by: determining, as a starting point, a specific location of the rotor along the path and a time at which the rotor was located at the specific location; and determining acceleration characteristics of the pod travelling over the path. Further embodiments of the method can also include determining actual location of the rotor via sensors fixed at specific locations along the path; and projecting when the rotor will be at a specific location along the path based upon the determined actual location. Embodiments of the method can include producing a transport plan by plotting a location and time of the rotor for each stator segment. The embodiments of the method can also include comparing presence and speed of the pod at specific locations along the path to the plan to account for discrepancies between the plan and actual positions of the rotor.

According to still other embodiments, the stator segments may include three sets of stator segments that are spaced from each other and aligned along the path, wherein each of the three sets of stator segments comprise aligned interconnected plural winding blocks. The embodiments of the method can also include switching the power to the three sets of stator segments off and on by controlling a three-phase thyristor switch connected to the three sets of stator segments. Embodiments of the method may also include: collecting information about a relative proximity of the rotor to the three sets of stator segments; and determining when to supply power to the three sets of segments via the three-phase thyristor switch. Further embodiments of the method can include: collecting information from a variable frequency drive; and synchronizing frequency and phase in handoffs between the variable frequency drive as the rotor travels along the path.

Embodiments are directed to a transportation system. The transportation system includes a rotor configured to travel over a specified path; a plurality of stator segments located at least along portions of the specified path where the rotor may be one of accelerated and decelerated; and a variable frequency drive connected to a power supply to supply a variable amplitude and frequency of voltage to power the stator segments in a synchronized manner so that, as the rotor approaches stator segments, the stator segments are powered and, as the rotor departs stator segments, the stator segments are depowered.

According to embodiments of the transportation system, a stator segment may include at least one block of windings.

In accordance with other embodiments of the transportation system, a stator segment can include interconnected blocks of windings.

In embodiments of the transportation system, the plurality of stator segments can be located with non-uniform spacing between adjacent stator segments.

According to still other embodiments, the transportation system can include sensors arranged along the path to determine an actual location of the rotor as it travels over the path.

In accordance with still yet other embodiments of the present invention, the stator segments can include three sets of stator segments that are spaced from each other and aligned along the path, and each of the three sets of stator segments comprise aligned interconnected plural winding blocks, the transportation system further comprising a three-phase thyristor switch connected to the three sets of stator segments.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for controlling a dynamic linear motor, comprising:
    defining a path over which a rotor is to travel;
    placing stator segments at least along portions of the path where the rotor may be one of accelerated and decelerated; and
    supplying a variable amplitude and frequency of voltage to power the stator segments in a synchronized manner so that, as the rotor approaches stator segments, the stator segments are powered and, as the rotor departs stator segments, the stator segments are depowered.

2. The method according to claim 1, wherein a stator segment comprises at least one block of windings.

3. The method according to claim 1, wherein a stator segment comprises interconnected blocks of windings.

4. The method according to claim 1, wherein a distance between successive stator segments along the path is not uniform.

5. The method according to claim 1, wherein the synchronized manner in which the power is supplied to the stator segments corresponds to a relative location of the rotor to the stator segments.

6. The method according to claim 5, further comprising determining an actual location of the rotor via sensors fixed at specific locations along the path.

7. The method according to claim 5, further comprising projecting when the rotor will be at specific locations along the path by:
    determining, as a starting point, a specific location of the rotor along the path and a time at which the rotor was located at the specific location;
    determining acceleration characteristics of the pod travelling over the path.

8. The method according to claim 5, further comprising:
    determining actual location of the rotor via sensors fixed at specific locations along the path; and
    projecting when the rotor will be at a specific location along the path based upon the determined actual location.

9. The method according to claim 5, further comprising producing a transport plan by plotting a location and time of the rotor for each stator segment.

10. The method according to claim 9, further comprising comparing presence and speed of the pod at specific locations along the path to the plan to account for discrepancies between the plan and actual positions of the rotor.

11. The method according to claim 1, wherein the stator segments comprise three sets of stator segments that are spaced from each other and aligned along the path, wherein each of the three sets of stator segments comprise aligned interconnected plural winding blocks.

12. The method according to claim 11, further comprising switching the power to the three sets of stator segments off and on by controlling a three-phase thyristor switch connected to the three sets of stator segments.

13. The method according to claim 12, further comprising:
    collecting information about a relative proximity of the rotor to the three sets of stator segments; and
    determining when to supply power to the three sets of segments via the three-phase thyristor switch.

14. The method according to claim 12, further comprising:
    collecting information from a variable frequency drive;
    synchronizing frequency and phase in handoffs between the variable frequency drive as the rotor travels along the path.

15. A transportation system, comprising:
    a rotor configured to travel over a specified path;
    a plurality of stator segments located at least along portions of the specified path where the rotor may be one of accelerated and decelerated; and
    a variable frequency drive connected to a power supply to supply a variable amplitude and frequency of voltage to power the stator segments in a synchronized manner so that, as the rotor approaches stator segments, the stator segments are powered and, as the rotor departs stator segments, the stator segments are depowered.

16. The transportation system of claim 15, wherein a stator segment comprises at least one block of windings.

17. The transportation system of claim 15, wherein a stator segment comprises interconnected blocks of windings.

18. The transportation system of claim 15, wherein the plurality of stator segments are located with non-uniform spacing between adjacent stator segments.

19. The transportation system of claim 15, further comprising sensors arranged along the path to determine an actual location of the rotor as it travels over the path.

20. The transportation system of claim 15, wherein the stator segments comprise three sets of stator segments that are spaced from each other and aligned along the path, and wherein each of the three sets of stator segments comprise aligned interconnected plural winding blocks, the transportation system further comprising a three-phase thyristor switch connected to the three sets of stator segments.

* * * * *